United States Patent [19]

Hsiao

[11] Patent Number: 5,372,019
[45] Date of Patent: Dec. 13, 1994

[54] AUTOMOBILE STEERING LOCK

[76] Inventor: Yung-Chi Hsiao, No. 19-1, Lane 245, Hsi Sheng Street, Hsin Chuang City, Taipei Hsien, Taiwan, Prov. of China

[21] Appl. No.: 125,857

[22] Filed: Sep. 24, 1993

[51] Int. Cl.⁵ .................... B60R 25/02; E05B 67/24
[52] U.S. Cl. ............................. 70/38 A; 70/39; 70/209; 70/226; 70/238; 70/247; 70/248
[58] Field of Search .............. 70/38 A, 39, 245–248, 70/ DIG. 49, 209, 211, 212, 225, 226, 237, 238

[56] References Cited

U.S. PATENT DOCUMENTS

| | | | |
|---|---|---|---|
| 3,604,227 | 9/1971 | Athanason | 70/38 A |
| 4,693,099 | 9/1987 | Cykman | 70/247 |
| 4,811,578 | 3/1989 | Masoncup et al. | 70/38 A X |
| 4,881,387 | 11/1989 | Kortenbrede | 70/39 |
| 5,228,320 | 7/1993 | Liou | 70/247 |

FOREIGN PATENT DOCUMENTS 3126035  1/1983  Germany ................ 70/38 A

Primary Examiner—Lloyd A. Gall
Attorney, Agent, or Firm—Varndell Legal Group

[57] ABSTRACT

An automobile steering lock consisted of a lock body received in an inner casing covered by an outer casing, a shackle having two opposite ends inserted into holes on the outer and inner casings and holes on the lock body and locked in place by two opposite stop plates, a lock cylinder disposed perpendicular to the shackle and having a bevel gear coupled to the plug thereof, a switch control gear meshed with the bevel gear and having two keys respectively engaged into a respective lock notch either stop plate, a microswitch, a light emitting diode and a burglar alarm respectively connected to the microswitch, whereby the microswitch is switched on as the shackle is inserted into position; turning the plug of the lock cylinder causes the bevel gear to turn the switch control gear in moving the stop plates toward each other, and therefore the shackle is unlocked.

3 Claims, 4 Drawing Sheets

AUTOMOBILE STEERING LOCK

BACKGROUND AND SUMMARY OF THE INVENTION

The present invention relates to an automobile steering lock which automatically turns the automobile burglar alarm into the alert mode and it is locked to the gear shift lever, and which has a cylinder lock disposed perpendicular to the shackle thereof convenient for the car driver to operate with the key.

A variety of steering locks and burglar alarms are known for automobiles. Because steering locks and burglar alarms are separately prepared and installed, the installation cost is high. Further, the keyway and the shackle of a steering lock are commonly disposed on the same side, therefore it is inconvenient to operate a steering lock with the key by the car driver.

The present invention has been accomplished under the aforesaid circumstances. It is therefore the principal object of the present invention to provide an automobile steering lock which has the keyway disposed in a direction perpendicular to the shackles thereof, so that the car driver can conveniently open the lock with the key. It is another object of the present invention to provide an automobile steering lock which comprises a shackle controlled microswitch connected to the car burglar alarm, so that the car burglar alarm is alerted as the steering lock is locked. It is still another aspect of the present invention to provide an automobile steering lock which comprises a light emitter diode indicator lamp which gives light when the car burglar alarm is alerted.

DETAILED DESCRIPTION OF THE PREFERRED EMBODIMENT

Figure 1:
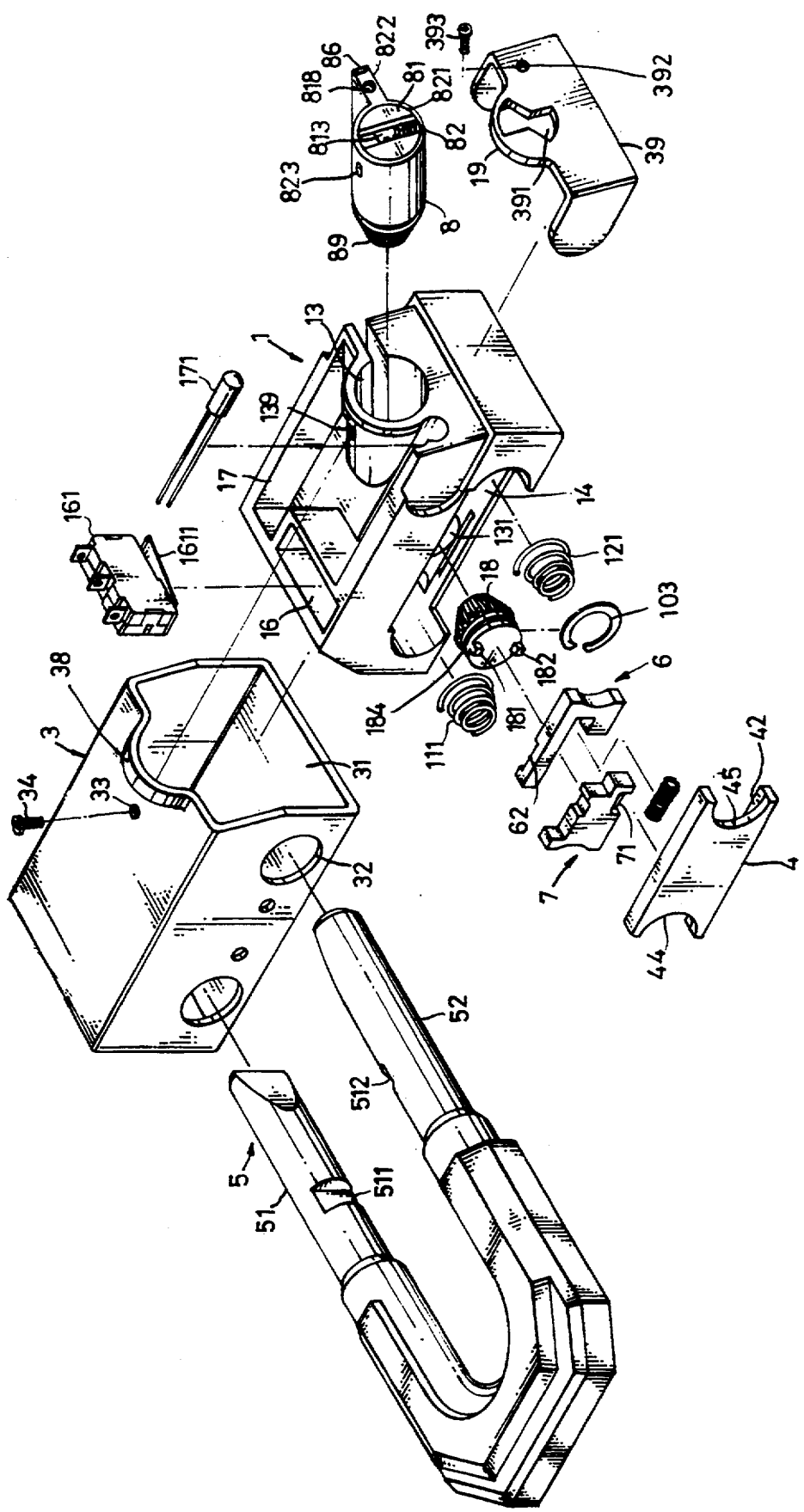
FIG. 1 is an exploded view of an automobile steering lock according to the preferred embodiment of the present invention.
Figure 2:
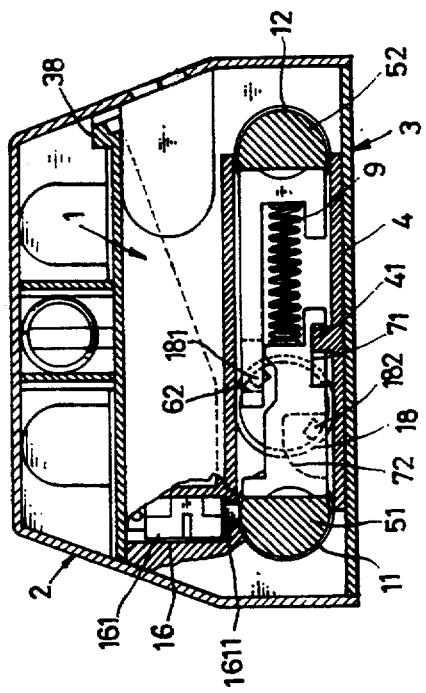
FIG. 2 is a sectional assembly view of the automobile steering lock.
Figure 4:
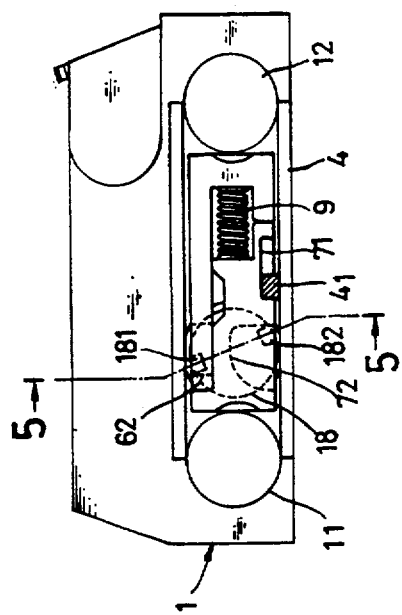
FIG. 4 is a sectional view of the lock body of the automobile steering lock.
Figure 5:
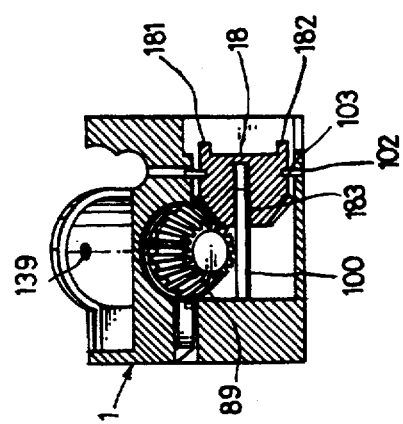
FIG. 5 is a cross section taken on line 5—5 of FIG. 4.

Referring to the annexed drawings in detail, an automobile steering lock in accordance with the present invention is generally comprised of a lock body 1, an outer casing 2, an inner casing 3, a locating plate 4, a shackle 5, and a lock cylinder 8, a microswitch 161, a light emitter diode indicator lamp 171, a burglar alarm circuit (not shown), a bevel gear 89, a switch control gear 18, and a lock cylinder protective plate 39.

Figure 3A:
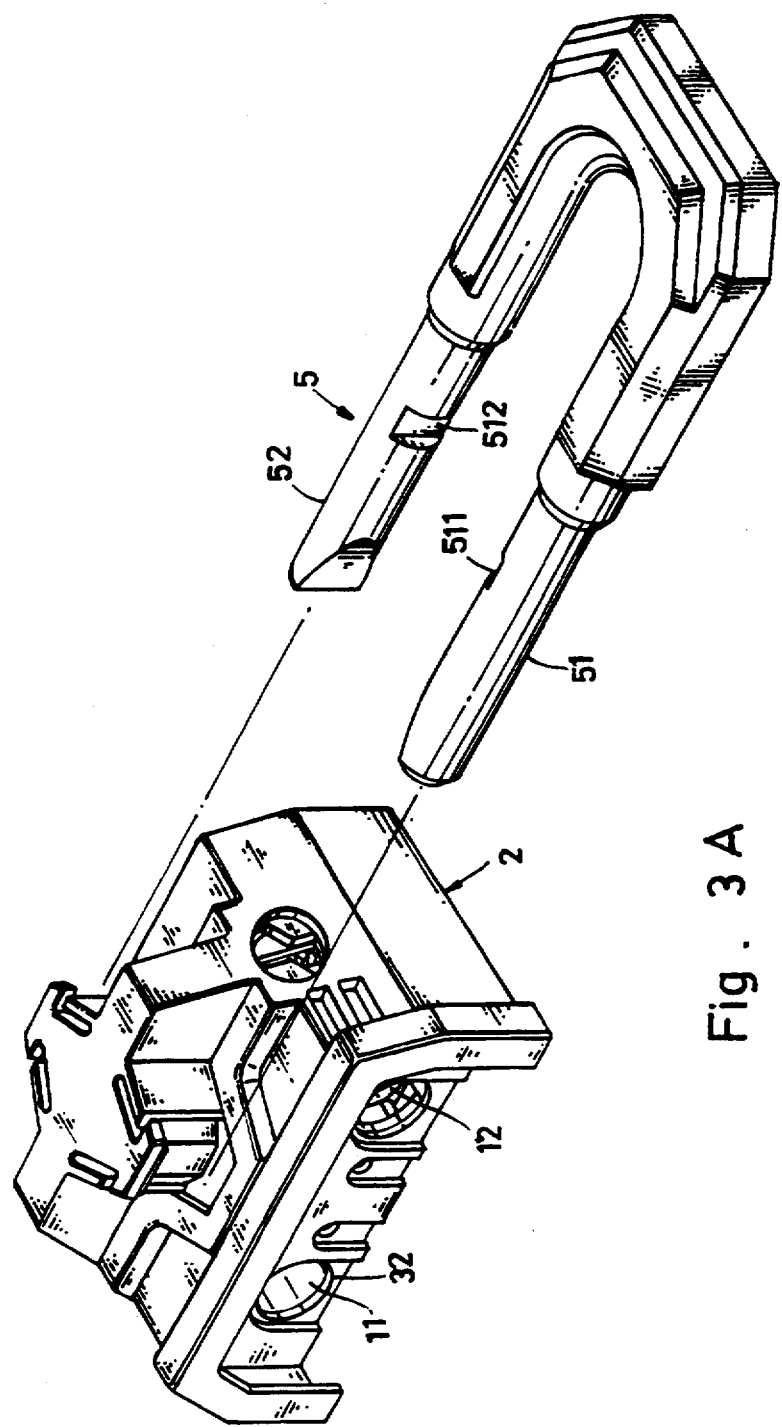
FIG. 3A is a perspective view of the automobile steering lock showing the shackle removed from the outer shell.
Figure 3B:
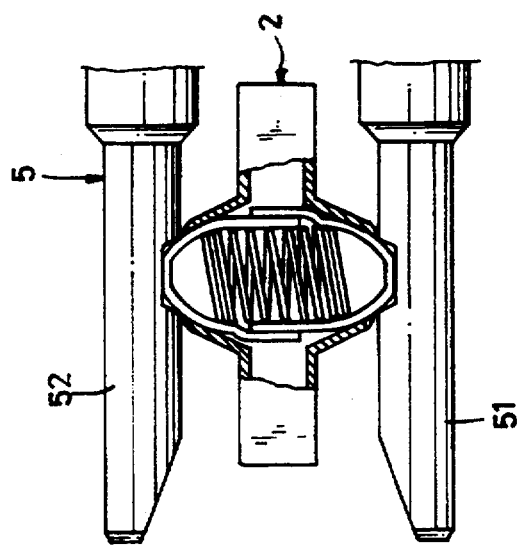
FIG. 3B is a partial sectional view of the automobile steering lock showing the relative positions of the shackle and the outer shell.

The lock body 1 comprises two shackle insertion holes 11, 12, which receive the shackle 5, two helical springs 111, 121 respectively received in the shackle insertion holes 11, 12, a lock cylinder mounting hole 13, which receives the lock cylinder 8, a front chamber 14 covered by the locating plate 4 to hold a left-hand stop plate 7, a right-hand stop plate 6, and a compression spring 9. The compression spring 9 is retained between the left-hand stop plate 7 and the right-hand stop plate 6. The outer casing 2 covers over the inner casing 3, having a top for attaching the shackle 5 (see FIGS. 3A and 3B) when the lock is not in use. The inner casing 3 comprises a horizontal chamber 31, which receives the lock body 1, two round holes 32 respectively aligned with the shackle insertion holes 11, 12. The shackle 5 is made from a substantially U-shaped bar having two opposite ends 51, 52 respectively inserted through the round holes 32 on the inner casing 3 into the shackle insertion holes 11, 12 on the lock body 1. Each end 51 or 52 has a lock notch 511 or 512 for locking. The lock cylinder 8 fits into the lock cylinder mounting hole 13, comprising a pin tumbler cylinder 82 and a plug 81 with a keyway 813 inserted into the pin tumbler cylinder 82. The rear end of the plug 81 is retained outside the pin tumbler cylinder 82 by a spring clamp (not shown). The pin tumbler cylinder 82 is made in a substantially keyway-like configuration comprised of a cylindrical portion 821 and a flat case portion 822 extended sideways from the cylindrical portion 821 along the length. The cylindrical portion 821 receives the plug 81. The flat case portion 822 is covered with a cover plate 86, having springs (not shown) and pins (not shown) retained in respective inside grooves (not shown) thereof for lock control.

The main features of the present invention is outlined hereinafter. The lock body 1 further comprises a round channel 131 communicated between the cylinder mounting hole 13 and the front chamber 14, a microswitch mounting hole 16 communicated with one shackle insertion hole 11 thereof, which receives the microswitch 161, a lamp mounting hole 17 on the top, which receives the light emitter diode indicator 5 lamp 171, and a screw hole 139 on the top. The switch control gear 18 is received in the round channel 131, comprising a back center hole 183 mounted on an inside projecting rod 100 on the inside of the round channel 131, a first key 181 and a second key 182 spaced on a front end thereof and respectively engaged into a groove 62 on the right-hand stop plate 6 and a groove 72 on the left-hand stop plate 7, and an annular groove 184 around the periphery. A packing ring 103 is engaged into an annular groove 102 inside the front chamber 14 of the lock body 1 and fastened around the annular groove 184 of the switch control gear 18, and therefore the switch control gear 18 is revolvably retained inside the round channel 131. Therefore, the right-hand stop plate 6 and the left-hand stop plate 7 are moved relative to each other as the switch control gear 18 is rotated. The bevel gear 89 is fastened to the rear end of the plug 81 and meshed with the switch control gear 18. The inner casing 3 further comprises an arched projecting portion 38 over the lock cylinder mounting hole 13, a screw hole 33 on the top in line with the screw hole 139 on the lock body. A tie screw 34 is threaded through the screw hole 33 on the inner casing 3, the screw hole 139 on the lock body 1 into a recessed hole 823 on the cylindrical portion 821 of the lock cylinder 8, and therefore the lock body 1 is firmly retained inside the inner casing 3 and the lock cylinder 8 is firmly retained inside the lock cylinder mounting hole 13. The lock cylinder protective plate 39 is covered on the lock body 1 over the lock cylinder 8, having a slot 391 defined within an arched projection 19 thereof and aligned with the keyway 813 on the plug 81. A tie screw 393 is threaded through a screw hole 392 on the lock cylinder protective plate 39 into a round hole 818 on the flat case portion 822 of the lock cylinder 8 to firmly retain the lock cylinder 8 in position. The locating plate 4 comprises a back center rod 41 fitted into a notch 71 on the left-hand stop plate 7, a horizontal back groove 42, in which the left-hand stop plate 7, the right-hand stop plate 6, and the compression spring 9 are slidably retained, and two opposing concave edges 44, 45 on two opposite ends thereof respectively aligned with the round holes 32 on the inner casing 3 and the shackle insertion holes 11, 12 on the lock body 1. The microswitch 161 is fastened inside the microswitch mounting hole 16 on the lock body, having a trigger plate 1611 extended into the shackle insertion hole 11 below the microswitch mounting hole 16. As the shackle 5 is inserted into the shackle insertion holes 11, 12, the trigger plate 1611 is triggered to turn on the microswitch 161, and therefore the burglar alarm which is connected to the microswitch 161 is armed up.

As the two opposite ends 51, 52 of the shackle 5 are respectively inserted into the round holes 32 on the inner casing 3 and the parallel holes 11, 12 on the lock body 1, the right-hand and left-hand stop plates 6, 7 are respectively squeezed inwards for allowing the two opposite ends 51, 52 of the shackle 5 to pass and then extended outwards by the compression spring 9 to respectively engage into the lock notch 511 or 512 on either end 51 or 52 of the shackle, and therefore the shackle 5 is locked in place. As the plug 81 is rotated by the key to turn the bevel gear 89, the switch control gear 18 is rotated to move the right-hand and left-hand stop plates 6, 7 toward each other, and therefore the two opposite ends 51, 52 of the shackle 5 are respectively released from the right-hand and left-hand stop plates 6, 7. As the shackle 5 is released from the right-hand and left-hand stop plates 6, 7, it is immediately pushed out of the lock body 1 by the helical spring 111, 121.

I claim:

1. An automobile steering lock comprising:
   an outer casing;
   an inner casing received inside said outer casing, said inner casing comprising a horizontal chamber, two spaced horizontal round holes respectively communicating with said horizontal chamber at right angles, and a screw hole vertically communicating with said horizontal chamber at a right angle;
   a lock body received inside said horizontal chamber of said inner casing, said lock body comprising two shackle insertion holes, two helical springs respectively inserted in said shackle insertion holes, a front chamber covered by a locating plate, said locating plate having a horizontal back groove and two concave edges on two opposite ends thereof respectively aligned with said shackle insertion holes, a round channel in said front chamber between said shackle insertion holes, a left-hand stop plate and a right-hand stop plate respectively received in said front chamber and made to slide in said horizontal back groove of said locating plate, said left-hand and right-hand stop plates each having a respective notch, a compression spring retained between said left-hand stop plate and said right-hand stop plate, a switch control gear revolvably retained in said round channel, said switch control gear comprising two keys spaced on a front end thereof respectively engaged into the notch on either stop plate, a lock cylinder mounting hole obliquely extended upwards and communicating with said round channel, a top screw hole communicating with said lock cylinder mounting hole and connected to the screw hole on said inner casing by a screw, a microswitch mounting hole communicating with one of said shackle insertion holes, a microswitch received in said microswitch mounting hole, said microswitch having a trigger bar extended into the respective shackle insertion hole, a light emitting diode mounting hole, a light emitting diode indicator lamp received in said light emitting diode mounting hole and connected to said microswitch, a lock cylinder received in said lock cylinder mounting hole, said lock cylinder comprising a casing holding a plug with a keyway, the casing of said lock cylinder having a recessed hole on a periphery and a round hole on a front end thereof, the screw which is threaded into the screw hole on said inner casing and the top screw hole on said lock body being engaged into the recessed hole on the casing of said lock cylinder to hold said lock cylinder in place, a bevel gear fastened to said plug of said lock cylinder at a rear end thereof and meshed with said switch control gear, a lock cylinder protective plate covered on said lock cylinder mounting hole over said lock cylinder, said lock cylinder protective plate having a slot aligned with the keyway on said plug of said lock cylinder and a screw hole connected to the round hole on the casing of said lock cylinder by a screw; and
   a shackle made from a substantially U-shaped bar having two opposite lock notches respectively disposed on two opposite ends thereof, the two opposite ends of said shackle being respectively inserted through the horizontal round holes on said inner casing and the concave edges on said locating plate into said shackle insertion holes and respectively stopped against said helical springs;
   whereby inserting the two opposite ends of said shackle into said shackle insertion holes causes said left-hand stop plate and said right-hand stop plate to respectively engage into the lock notch on either end of said shackle in locking said shackle in said lock body, and simultaneously causes said trigger bar of said microswitch to be triggered to turn on said light emitting diode indicator lamp; rotating said plug of said lock cylinder by the key causes said bevel gear to turn said switch control gear, and therefore said left-hand and right-hand stop plates are moved toward each other by the keys of said switch control gear to release the two opposite ends of said shackle for permitting said shackle to be removed out of said lock body.

2. The automobile steering lock of claim 1 wherein said switch control gear comprises a pin hole on a rear end thereof revolvably mounted on a pin inside said round channel of said lock body.

3. The automobile steering lock of claim 1 wherein said front chamber of said lock body comprises a groove into which a packing ring is engaged and fastened around an annular groove around the front end of said switch control gear.

* * * * *